(12) United States Patent
Guillou et al.

(10) Patent No.: US 9,109,167 B2
(45) Date of Patent: Aug. 18, 2015

(54) INTEGRATED PROCESS FOR TREATMENT AND GASIFICATION OF BITUMINOUS FEEDSTOCKS BY CHEMICAL LOOPING COMBUSTION

(75) Inventors: Florent Guillou, Ternay (FR); Ali Hoteit, Paris (FR)

(73) Assignees: IFP ENERGIES NOUVELLES, Rueil-Malmaison (FR); TOTAL SA, Courbevoie (FR)

( * ) Notice: Subject to any disclaimer, the term of this patent is extended or adjusted under 35 U.S.C. 154(b) by 472 days.

(21) Appl. No.: 13/642,855

(22) PCT Filed: Apr. 21, 2011

(86) PCT No.: PCT/FR2011/000244
§ 371 (c)(1),
(2), (4) Date: Dec. 19, 2012

(87) PCT Pub. No.: WO2011/131867
PCT Pub. Date: Oct. 27, 2011

(65) Prior Publication Data
US 2013/0118076 A1    May 16, 2013

(30) Foreign Application Priority Data
Apr. 23, 2010   (FR) .................................... 10 01751

(51) Int. Cl.
| C01B 3/36 | (2006.01) |
| C10G 1/04 | (2006.01) |
| B01J 8/26 | (2006.01) |
| B01J 8/38 | (2006.01) |
| F23C 99/00 | (2006.01) |

(52) U.S. Cl.
CPC . *C10G 1/047* (2013.01); *B01J 8/26* (2013.01); *B01J 8/388* (2013.01); *F23C 99/00* (2013.01); *C10G 2300/805* (2013.01); *F23C 2900/99008* (2013.01); *Y02E 20/346* (2013.01)

(58) Field of Classification Search
CPC ...................................................... C10G 1/047
See application file for complete search history.

(56) References Cited

U.S. PATENT DOCUMENTS

| 4,399,314 A | 8/1983 | Child |
| 5,447,024 A | 9/1995 | Ishida et al. |
| 2009/0020456 A1* | 1/2009 | Tsangaris et al. ............. 208/133 |
| 2011/0094226 A1* | 4/2011 | Mchugh et al. ................. 60/645 |
| 2011/0266196 A1* | 11/2011 | Gauthier et al. ................ 208/95 |
| 2013/0139695 A1* | 6/2013 | Chang et al. .................... 96/235 |

FOREIGN PATENT DOCUMENTS

| FR | 2 850 156 A1 | 7/2004 |
| FR | 2 887 557 A1 | 12/2006 |
| WO | WO 2007/082089 A3 | 7/2007 |
| WO | WO 2009/138595 A2 | 11/2009 |
| WO | WO 2010/046562 A2 | 4/2010 |

* cited by examiner

*Primary Examiner* — Imran Akram
(74) *Attorney, Agent, or Firm* — Fitch, Even, Tabin and Flannery LLP (57) ABSTRACT

The object of the invention is a process for treating bituminous feedstocks wherein the energy required to separate the organic and mineral fractions of said bituminous feedstocks in a treatment unit powered by hot water is provided by chemical looping combustion (CLC).

10 Claims, 4 Drawing Sheets

INTEGRATED PROCESS FOR TREATMENT AND GASIFICATION OF BITUMINOUS FEEDSTOCKS BY CHEMICAL LOOPING COMBUSTION

FIELD OF THE INVENTION

Considering the climate changes observed during the past decades and those predictable in the long term, controlling greenhouse gas emissions is becoming an increasingly strong requirement for all economic sectors, in particular those concerning energy production. At the same time, the fossil energy resources tend to decrease, which favours the development of increasingly heavy and complex hydrocarbons, more and more expensive to develop, such as bituminous sands and oil shales. Extraction of these feedstocks requires large amounts of heat. This heat is typically provided by natural gas combustion. Bituminous sand treatment units are $CO_2$ emitting units since methane combustion is achieved in air. One of the various possible ways of controlling greenhouse gas discharge to the atmosphere is carbon capture and sequestration. Among the means allowing $CO_2$ capture in bituminous sand and/or oil shale treatment units, chemical looping combustion affords the advantage of producing combustion fumes free of nitrogen from the combustion air.

Thus, assuming a gas, a solid and/or a liquid burning completely with oxygen supplied, for example, by particles such as metallic oxides, the fumes would only be made up of $CO_2$ and of water vapour which, once cooled to below 100° C. and freed of the condensed water, would consist of nearly pure $CO_2$ that can be sequestered.

Chemical looping combustion (CLC) involves a high potential in terms of energy efficiency and cost reduction. This method avoids the energy penalty linked with the separation of oxygen and air. It is based on the oxygen transfer capacity of some materials such as metallic oxides. In CLC, an air reactor is used to oxidize the oxygen carriers prepared in form of fine particles that are then transferred to a fuel reactor where they are reduced by combustion of the fuel. When the oxygen amount is in excess in relation to the combustion requirements, chemical looping allows to carry out total combustion of the fuel and to produce fumes essentially containing $CO_2$ while maximizing the energy produced. By limiting the oxygen supply, for example by controlling the circulation of the oxidizing masses, it is also possible to achieve partial combustion of the fuel and to produce fumes consisting at least partly of a mixture of CO and $H_2$ which, after downstream treatment and purification, can serve as the feed in conversion or energy production processes. This partial combustion limits the energy production but it thereafter allows to upgrade the hydrogen-containing fumes produced.

BACKGROUND OF THE INVENTION

Bituminous sands are among the major hydrocarbon resources. However, these resources involve development difficulties due to their high density and viscosity, and they generally have an API degree below 10° API. They come in form of an organic component and a mineral component. The organic component is also referred to as bitumen. The mineral component is for example made up of sand, clay, metals or metallic oxides. Typically, a bituminous sand has an organic component that represents approximately one tenth of its mass, but this proportion can be highly variable.

In the case of bituminous sands extracted from a mine, most methods for separating the bitumen from the sand are based on the flotation method developed by Clark. It consists in bringing the bituminous sand into the presence of hot water (generally at 82° C., a temperature at which the density differential is maximal between the bitumen and the water) and soda (at a concentration ranging between 0.03 and 0.1 wt. % NaOH), as described in the article "The Chemistry of Alberta Oil Sands, Bitumens and Heavy Oils, O. P. Strausz, E. M. Lown, Alberta Energy Research Institute, Calgary, Alberta, Canada, 2003, p. 57-67".

The separation mechanism corresponds to a separation by flotation where the bitumen forms a foam by becoming attached to air bubbles, the sand settling in the bottom of the treatment reactor. Three streams are produced: a solid stream containing the sand and less than 5% bitumen, a basic water stream containing a small percentage of the bitumen (around 5 wt. %) and a foam containing nearly all of the initial bitumen (fraction above 90 wt. %). The aqueous phase is treated with an organic solvent (of gasoline type) in order to recover the bitumen and to increase the bitumen recovery rate so as to raise it to above 95%.

In the case of deep bituminous sands, the separation method generally used consists in injecting vapour under pressure into the geological formation containing the bituminous sand. The heat supplied by the vapour fluidifies the organic component that then flows downward to the bottom of the formation through gravity and is recovered through dedicated underground lines.

Whether in the case of an in-situ method wherein vapour is injected into the ground and bitumen is directly recovered, or in the case of a mining method wherein the bitumen is extracted from the ground with the sand, then separated with hot water and soda, large amounts of water and of heat are necessary. In nearly all the cases, the heat is supplied by the combustion of natural gas imported on the production site, without capture of the carbon dioxide ($CO_2$) produced. This involves connection of the site to the natural gas network, often distant from the production sites, and combustion of natural gas whose price evolves with that of oil and is going to rise in the forthcoming years. The order of magnitude of natural gas consumption ranges from 10 to 30 $m^3$ natural gas burned per barrel of Athabasca produced, depending on whether the bitumen is respectively recovered by surface mining or by steam-assisted gravity drainage (Canadian Energy Research, CERI study No. 108 in "Overview of Canadian Oil Industry", 2004). For a production of 100 000 barrels/day, the total natural gas consumption is above 300·$10^6$ $m^3$/year.

Chemical looping combustion is an oxycombustion type method wherein a hydrocarbon is oxidized on contact with an oxygen-carrying solid. Its operation is based on the reversible shift of this solid from one oxidation degree to a second, by gain or loss of oxygen atoms depending on the medium and on the reaction conditions. To achieve this alternation, one option consists in using a circulating bed where the solid is carried from an oxidizing reaction medium to a reducing reaction medium.

This complex technology has been the subject of many patents mainly based on the combustion of feedstocks nearly predominantly made up of hydrocarbons, whether gaseous (U.S. Pat. No. 5,447,024), liquid or solid (FR-2,850,156).

The applicant has developed a process for treating feedstocks such as bituminous sands or oil shales comprising both a mineral component, such as sand or clay, and an organic component, such as a bitumen type hydrocarbon, the energy required to operate the process being preferably provided by the combustion of this organic component under chemical looping combustion conditions. This energy production mode is particularly interesting within the context of bituminous feedstock extraction insofar as it allows to develop a local unrefined energy source while allowing the environmental impact to be limited through easier capture of greenhouse gases, more particularly $CO_2$, and through potential water resources saving.

SUMMARY OF THE INVENTION

The invention relates to the optimized integration of a chemical looping combustion (CLC) process suited to energy production for treating bituminous sands and optionally for gasifying bituminous sands and/or oil shales. The object thereof is a process for treating bituminous feedstocks wherein the energy required to separate the organic and mineral fractions of said bituminous feedstocks in a treatment unit powered by hot water is provided by chemical looping combustion.

DETAILED DESCRIPTION OF THE INVENTION

The object of the invention is a process for treating bituminous feedstocks wherein the energy required to separate the organic and mineral fractions of said bituminous feedstocks in a hot water treatment unit is provided by chemical looping combustion (CLC).

By way of example, a typical bituminous sand composition is as follows (according to XIA and GREAVES, Trans IchemE, Part A Chemical Engineering Research and Design, 2006, 84(A9): 856-864):

Properties of an Athabasca Bituminous Sand

| | | |
|---|---|---|
| API (°) | | 8 |
| Density at 25° C. (g · cm$^{-3}$) | | 1.0077 |
| Elemental mass composition (wt. %) | C | 81-84 |
| | H | 10-11 |
| | N | 0.3-0.6 |
| | S | 4.6-5.6 |
| Viscosity at 15° C. (mPa · s) | | 18000-1000000 |
| SARA composition (wt. %) | Saturated | 14.5 |
| | Aromatics | 34.8 |
| | Resins | 38 |
| | Asphaltenes | 12.7 |
| Porosity (%) | | 34 |
| Oil content (wt. %) | | 13.6-15.3 |
| Water content (wt. %) | | 1.75 |

Chemical looping combustion consists in contacting a hydrocarbon feedstock with a metallic oxide at high temperature. The metallic oxide then yields part of the oxygen it contains, which takes part in the combustion of the hydrocarbons. After this combustion, the fumes contain predominantly carbon oxides, water and possibly hydrogen. In fact, it is not necessary to contact the air with the hydrocarbon, and the fumes are thus predominantly made up of combustion gases and possibly of a dilution gas used for transport and fluidization of the particles (water vapour for example). It is thus possible to produce predominantly nitrogen-free fumes with high $CO_2$ contents (above 90 vol. %) allowing to consider $CO_2$ capture, then storage. The metallic oxide that has taken part in the combustion is then carried to another reaction enclosure where it is contacted with air in order to be re-oxidized. If the particles coming from the combustion zone are free of fuel, the gases from this reaction zone are predominantly free of $CO_2$, which is then only present as traces, for example at concentrations below 1 to 2 vol. %, and they essentially consist of oxygen-depleted air, as a result of the oxidation of the metallic particles.

The feedstocks usable for chemical looping combustion are generally hydrocarbons (natural gas, liquid petroleum feedstocks, petroleum residues, solid feeds such as coal or coke resulting from coking processes, oil shales and preferably bituminous sands or bitumina resulting from the treatment of bituminous sands). In the case of bituminous feedstocks, their treatment in a chemical looping process enables to treat them directly without having to carry out an intermediate treatment or conversion.

According to the process of the invention, heat (or energy) is recovered at various points of the loop, through exchanges with the solids or the gases circulating in the unit so as to be used for separation of the organic and mineral fractions of the bituminous feedstocks.

Advantageously, part of the bitumen thus produced is used as fuel in the chemical loop, allowing to reduce the metallic oxides in the reduction reactor, and replaces the natural gas commonly used in conventional treatment units. The "recycled" bitumen fraction used as fuel in the reduction reactor generally represents 0.1 to 10 wt. % of the bitumen produced, preferably 0.1 to 5 wt. %.

According to another advantageous embodiment of the process of the invention, the bituminous feedstock is fed directly into the reduction reactor of the chemical loop.

According to another advantageous embodiment of the process of the invention, the bituminous feedstock is treated in a fluidized-bed reactor to produce a syngas, said feedstock being treated simultaneously or not with a fraction of the bitumen extracted from the hot water treatment unit. In this case, the energy required to operate the fluidized bed is supplied by the chemical loop, as well as the energy required to operate the hot water treatment unit.

The amount of bitumen extracted in relation to the sand is variable depending on the extraction sites, and part of the bitumen produced can be added to the bituminous sand to adjust the bitumen/sand ratio in the gasification reactor.

Besides, the electricity required to treat the bituminous sands can be produced by upgrading the high-temperature heat of the gaseous and solid effluents of the process, for example using hot gas or steam turbines.

Whatever the fuel used for reduction of the metallic oxides in the "fuel" reactor (natural gas or coal or oil coke), the process produces a $CO_2$-concentrated combustion gas that facilitates the recovery thereof.

The combustion of a hydrocarbon, here preferably bitumen, in a chemical looping combustion process is an oxy-combustion type, i.e. the gaseous combustion effluent is predominantly made up of carbon dioxide and water which, after condensation thereof, becomes a $CO_2$-rich stream that can be compressed and stored within the context of a $CO_2$ capture and storage sequence. The water that has been condensed can then be sent for treatment of the bituminous feedstock, thus saving the water resource.

Implementing a chemical looping combustion process requires large amounts of metallic oxide in contact with the fuel. These metallic oxides are generally contained either in ore particles, or in particles resulting from industrial treatments (residues from the iron and steel industry or from the mining industry, used catalysts from the chemical industry or refining). It is also possible to use synthetic materials such as, for example, alumina or silica-alumina supports on which metals that can be oxidized (nickel oxide for example) have been deposited.

The metallic oxides usable for chemical looping combustion are generally Fe, Ti, Ni, Cu, Mg, Mn, Co, V oxides, used alone or in admixture. These metals can come in form of natural ores (such as ilmenite) or deposited on a synthetic support or on a used catalyst. Preferably, these solids are conditioned in powder form, with a Sauter diameter preferably ranging between 30 and 500 microns, and a grain density ranging between 1400 and 8000 kg/m$^3$, preferably between 1400 and 5000 kg/m$^3$.

Depending on the metallic oxide used, the amount of oxygen theoretically available varies considerably and it can reach high values close to 30%. However, depending on materials, the maximum capacity of oxygen really available does generally not exceed more than 20% of the oxygen present. The capacity of these materials to yield oxygen does therefore globally not exceed more than a small percentage by weight of the particles and it varies considerably from one oxide to another, generally ranging from 0.1 to 15%, often from 0.3 to 13 wt. %. Implementation in a fluidized bed is therefore particularly advantageous for conducting the combustion. In fact, the finely divided oxide particles circulate more readily in the combustion and oxidation reaction enclosures, and between these enclosures, if the properties of a fluid are conferred on the particles (fluidization).

Chemical looping combustion allows to produce energy, in form of vapour or electricity for example. The combustion heat of the feedstock is similar to that encountered in conventional combustion. It corresponds to the sum of the reduction and oxidation heats in the chemical loop. The distribution among the reduction and oxidation heats greatly depends on the metallic oxides used for conducting the chemical looping combustion. In some cases, the exothermicity is distributed among the oxidation and the reduction of the metal. In other cases, the oxidation is highly exothermic and the reduction is endothermic. In any case, the sum of the oxidation and reduction heats is equal to the combustion heat of the fuel.

The heat (or energy) required for separation in the hot water treatment unit is extracted by exchangers arranged inside, on the wall of or added to the combustion and/or oxidation enclosures, on the fume lines or on the metallic oxide transfer lines.

The process according to the invention thus allows to treat, without any preliminary treatment, bituminous feedstocks with $CO_2$ capture, to recover the water formed upon oxidation of the fuel at a suitable temperature for bituminous sand treatment and thus to use a lesser proportion of water.

Another advantage according to the invention is the recovery of a sufficient amount of energy in the chemical loop to ensure separation of the organic fraction and of the mineral fraction of bituminous feedstocks.

Another advantage of the process according to the invention is that it allows to produce a syngas under pressure from bituminous sands and/or oil shales.

An additional advantage of the process according to the invention is that it facilitates $CO_2$ capture.

Another object of the invention is the plant allowing the process described above to be implemented, which comprises at least:

a chemical loop containing an oxidation reaction zone, supplied with air, referred to as "air" reactor, wherein the reaction of oxidation of metallic oxides occurs after their reduction in a reaction zone, referred to as "fuel" reactor, where combustion of the feedstock takes place in the presence of a fuel and of the oxygen present in said metallic oxides, one or more exchangers arranged inside, on the wall of or added to the enclosures containing the combustion and/or oxidation enclosures of the chemical loop, on the fume lines or on the metallic oxide transfer lines in order to produce a heat flux for heating a water stream carried by a line (8) in an exchange zone, a separation zone for the mineral component extracted through a line and the organic component (bitumen) of the feedstock extracted through a line operating in the presence of water and soda, at a temperature ranging between 80° C. and 90° C., the water being heated in the zone.

The plant also comprises means between the various zones allowing control of the circulation, sealing or separation between the particles and the gas, or between particles having different characteristics, such as the sand and the metallic oxides.

These means can be, for example, L-valves, siphons, separators.

If it is desired to gasify the feedstock, the plant also comprises a gasification reaction zone, referred to as "gasification reactor" for the solid and/or liquid feedstocks to produce a syngas.

The reaction zones are contained in reactors of fluidized, ebullating or circulating bed type, fixed beds or layouts with several of these elements operated in series or in parallel.

According to a variant, the gasification reaction and the reduction reaction are carried out in the same reactor, in two distinct reaction zones.

Advantageously, the reactions in the "air", "fuel" and gasification reactors take place at a temperature ranging between 700° C. and 1200° C., preferably between 750° C. and 950° C.

The residence time of the metallic oxides in the "fuel" reactor depends on the nature of the fuel and it can generally be estimated between 30 seconds and 10 minutes, preferably between 1 and 10 minutes.

The residence time of the metallic oxides in the air reactor depends on the state of oxidation and/or of reduction of these oxides and it can generally be estimated between 10 seconds and 10 minutes, preferably between 20 seconds and 3 minutes.

The residence time of the metallic oxides in the gasification reactor depends on the nature of the fuel to be gasified and it can generally be estimated between 1 and 20 minutes, preferably between 1.5 minutes and 10 minutes.

An oxygen carrier is characterized by its oxygen carrying capacity, i.e. the amount of oxygen this oxygen carrier can reversibly exchange with the reaction medium between its most oxidized and least oxidized state. X is defined as the fraction of the total capacity of transfer of the oxygen remaining in the oxide and $\Delta X$ is defined as a fraction of the total oxygen transfer capacity.

The invention is illustrated by way of non limitative example by FIGS. 1 to 4.

Figure 1:
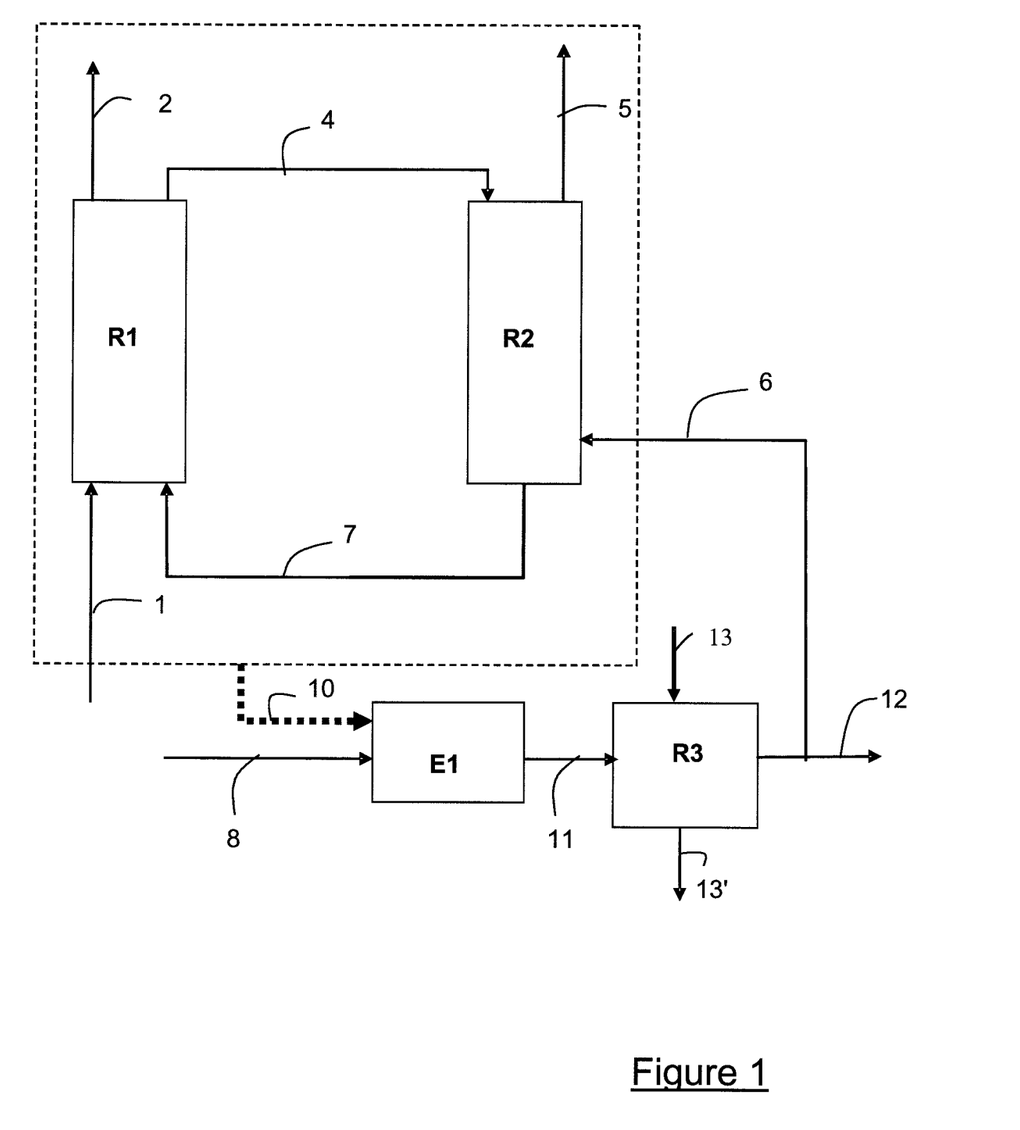
FIG. 1 shows the general principle of the invention.

In FIG. 1, a metallic oxide stream circulates, through a line (4), from oxidation reactor (or "air" reactor) (R1) supplied with air to reduction reactor (or "fuel" reactor) (R2) wherein combustion of the feedstock occurs through reduction of the oxygen-carrying materials MeO for a duration generally ranging between 1 and 15 minutes. The metallic oxides at the outlet of reduction reactor R2 partly come in metal form ($MeO_{1-x}$), with $0 \leq X \leq 0.5$, after reaction between the oxygen existing in their structure and the fuel flowing into reduction reactor (R2) through a line (6). The gaseous effluents produced by the oxidation of the fuel flowing into reduction reactor (R2) consist nearly exclusively of water and carbon dioxide. They are discharged through a line (5) on which heat can be provided by means of a heat exchange zone (not shown).

The metallic oxides in reduced form circulate through a line (7) of "fuel" reactor (R2) to oxidation reactor (R1) so as to be re-oxidized to their most oxidized state MeO, with $0.8 \leq X \leq 1$, preferably $0.95 \leq X \leq 1$. The chemical loop can comprise a zone intended for heat recovery on the circulating solid (not shown). Oxidation of the solid is achieved by means of the air delivered through a line (1) and it produces a depleted air effluent discharged from oxidation reactor (R1) through a line (2). The heat produced by the oxidation is recovered by means of the exchange zone (not shown). The entire heat recovered in the exchange zones is symbolized by stream (10) and it is used for heating a water stream (8) so as to produce hot water in an exchange zone (E1). The hot water produced is sent through a line (11) to bituminous sand treatment unit (R3) supplied with bituminous sand through a line (13). At the outlet of separation zone (or treatment unit) (R3), one of the products is bitumen that is extracted through a line (12). Part of this bitumen is sent to (R2) through a line (6) as fuel. The rest of the bitumen is extracted from the unit to be upgraded.

A mineral fraction (essentially sand and water) is also extracted from zone (R3) through a line (13').

Figure 2:
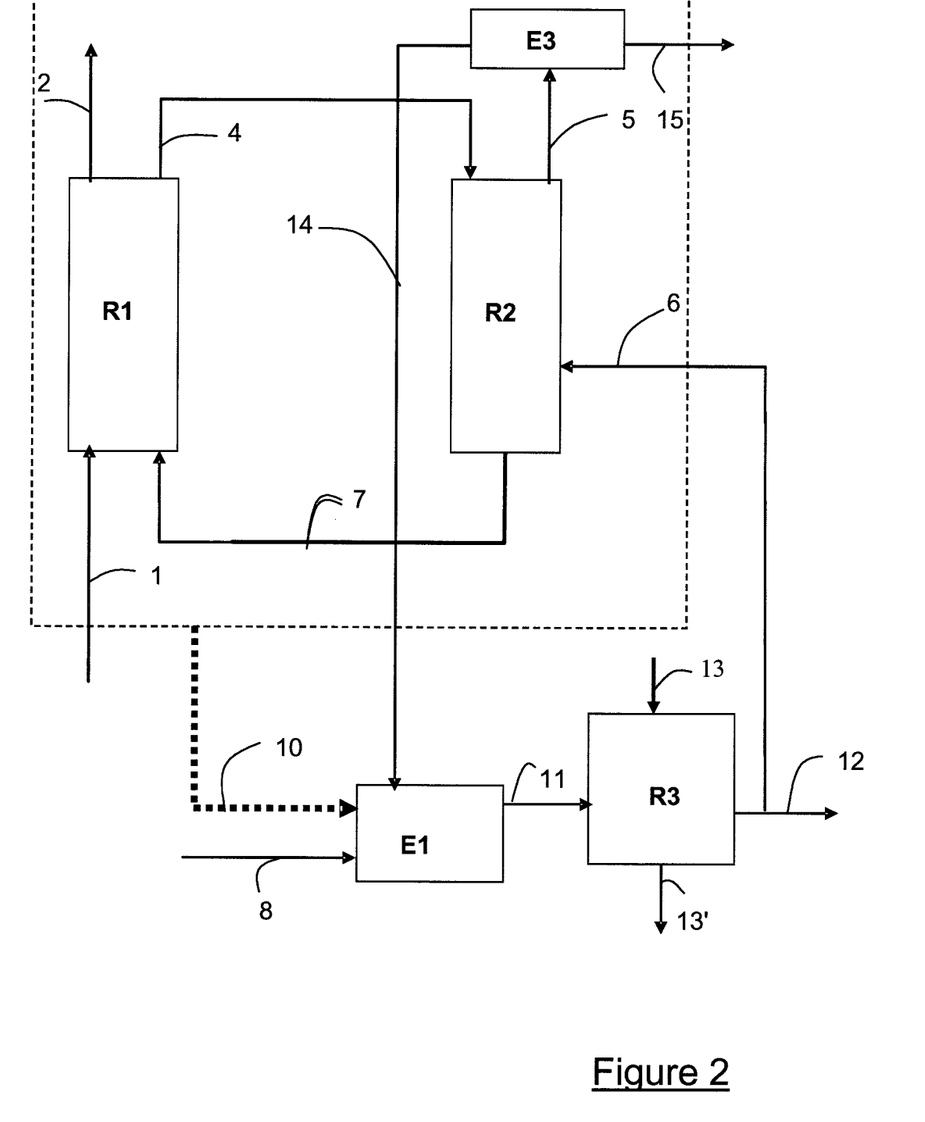
FIG. 2 differs from FIG. 1 in that a condensation zone is present at the reduction reactor outlet, FIG. 3 corresponds to a scheme including a fluidized-bed reactor, and FIG. 4 corresponds to a scheme wherein heat is produced from fuel consisting of bituminous sand or crude oil shales directly fed into the reduction reactor.

The process of FIG. 2 differs from that of FIG. 1 by the fact that a condenser (E3) is present on gaseous effluent (5) from reduction reactor (R2). $CO_2$-rich gaseous effluent (5) is cooled so that gaseous effluent (15) is as $CO_2$-rich as possible so that it can be compressed for optional transport and/or storage operations. The hot water recovered in condenser (E3) is recovered and carried through a line (14) to exchange zone (E1) where it is mixed with the water stream delivered through line (8).

This configuration allows both to meet a technical requirement as regards $CO_2$ capture with a view to its sequestration and to recover water at a suitable temperature for bituminous sand treatment, and thus to use a lesser proportion of water.

Figure 3:
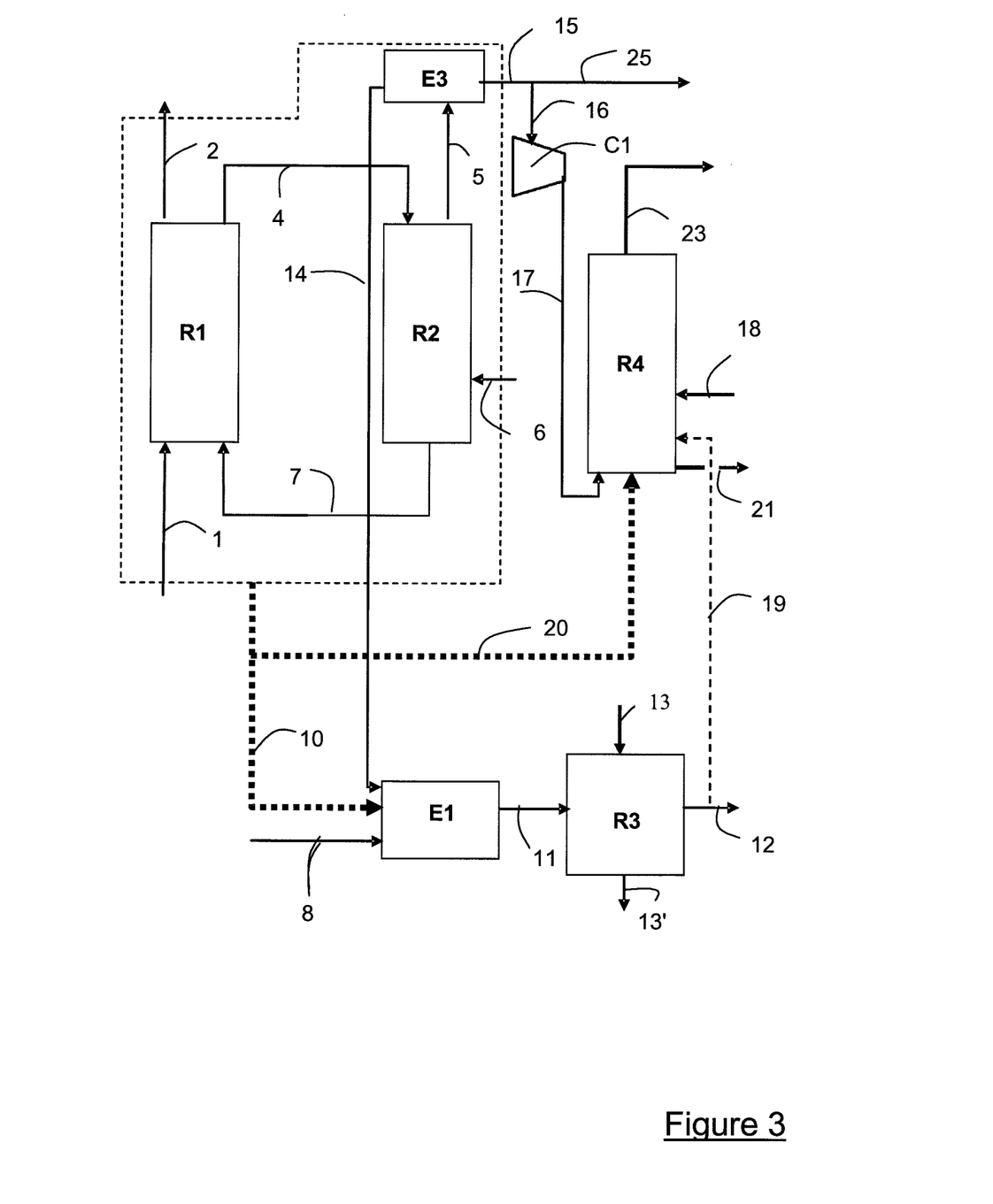

FIG. 3 shows a process scheme allowing to produce syngas under pressure, directly from a crude bituminous feedstock, i.e. whose mineral component (sand for example) has not been separated from its organic component (bitumen), or from bitumen from zone (R3), or from a bitumen-bituminous sand mixture if it is desired to adjust the mineral component/bitumen ratio. This configuration also allows oil shale gasification.

The description of the figure is similar to that of FIG. 2 except for stream (6) that corresponds to the fuel supplied to reduction reactor (R2). In the case of FIG. 3, the fuel is either natural gas, or a solid or liquid hydrocarbon, or coal, and it is fed through line (18), or it is bitumen from zone (R3).

All or part of the $CO_2$-rich and water-depleted gaseous stream (15) from condenser (E3) is sent to a compressor (C1) through a line (16), the remaining stream (25) being optionally extracted from the unit and conditioned for transport and storage. At the compressor discharge end, the $CO_2$-rich stream under pressure is sent through a line (17) to a fluidized bed reactor (R4), which enables fluidization of the bed of reactor (R4). Reactor (R4) is continuously supplied with fuel, in whole or in part by a bituminous sand supply through line (18), possibly completed by a bitumen supply from zone (R3) through a line (19). The elements allowing the fuel under pressure to be introduced are not shown. The bitumen, whether fed directly or not in bituminous sand form, is gasified to a mixture predominantly consisting of carbon monoxide and dihydrogen (or syngas), and extracted from reactor (R4) through a line (23). The heat supply in reactor (R4) is provided by the reactants and it can optionally be completed by a fraction (20) of heat flux (10) so as to provide conditions favourable to the gasification of the feedstock. The mineral component of the bituminous sand, i.e. the sand, does not react and it is extracted on a continuous basis from gasification reactor (R4) so as to produce a hot sand stream (21). The heat of this hot sand can optionally be upgraded in an exchange zone (not shown) so as to complete the heat supplied for example by streams (10) and (20).

Figure 4:
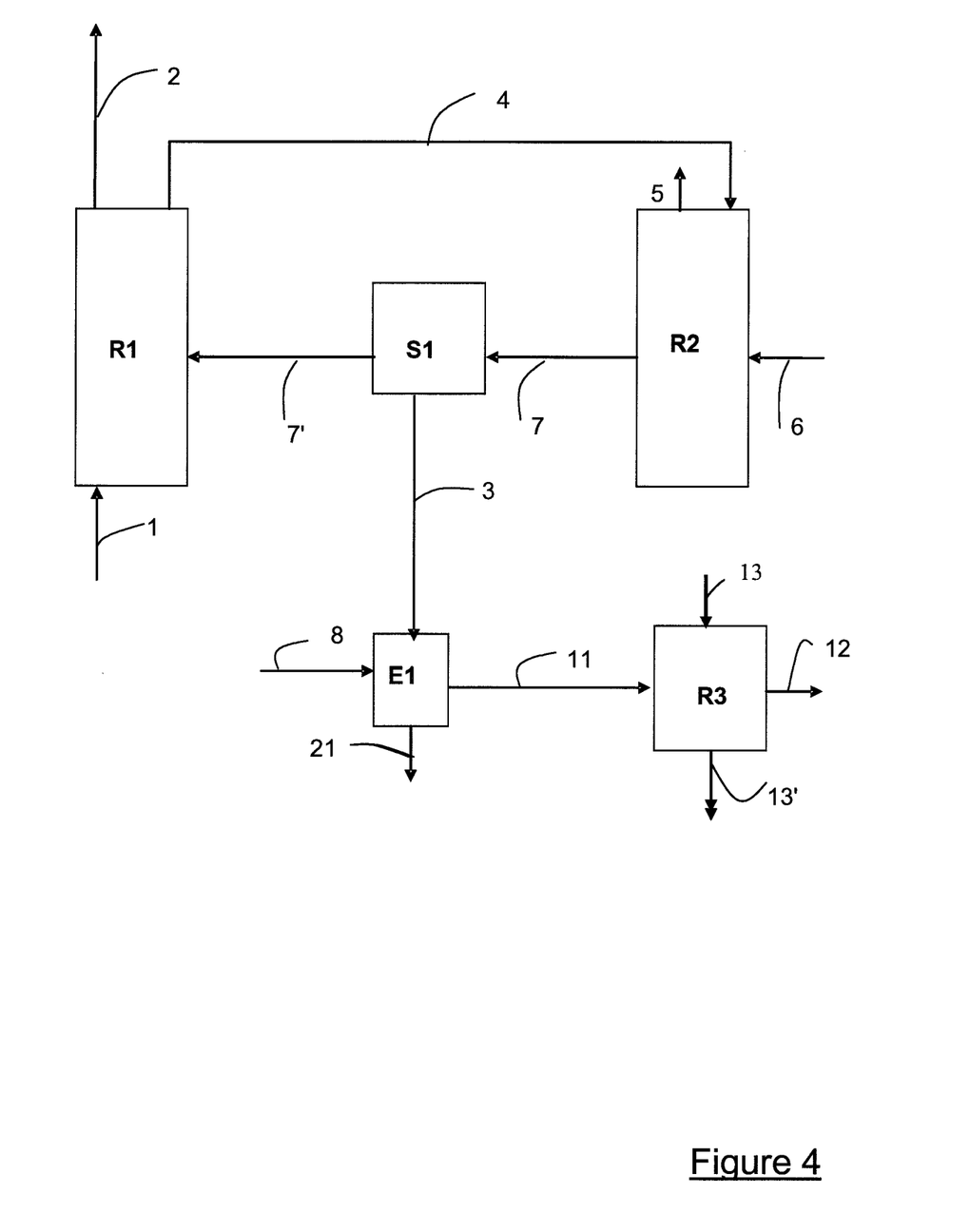

FIG. 4 shows a process of the invention where heat is produced from fuel consisting of bituminous sand or crude oil shales directly fed into reduction reactor (R2).

The fuel consisting of bituminous sands or oil shales is fed through line (6) into reduction reactor (or "fuel" reactor) (R2) wherein combustion of the feedstock occurs through reduction of the oxygen-carrying material (or solid) MeO. The latter is extracted from (R2) in reduced form ($MeO_{1-x}$) through a line (7) and sent to a solid-solid separator (S1) wherein the sand (or the shale) is separated from the oxygen-carrying solid and carried through a line (3) to heat exchange zone (E1). The oxygen-carrying solid is extracted from separator (S1) through a line (7') and sent to oxidation reactor (R1) in order to be re-oxidized to its most oxidized form MeO. In heat zone (E1), the hot sand is the heat-carrying "fluid" allowing to heat the water delivered through line (8) and the cooled sand is extracted through line (21).

The other lines and equipments correspond to those described above.

EXAMPLE

The example below (corresponding to the schemes of FIGS. 1 and 2) implements the operating principle of a bituminous sand treatment unit associated with a chemical loop for bitumen combustion, the oxygen carrier being nickel oxide.

The feedstock treated is an Athabasca type bituminous feedstock.

The goal is to produce 100 000 barrels/day of Athabasca. We therefore consider that 2 barrels of water are required per barrel of Athabasca produced.

In the "fuel" reactor operating at a temperature of 900° C., reduction of the oxygen-carrying materials is performed by contact between the materials and the bitumen, in the "air" reactor operating at a temperature of about 950° C., the reduced materials are oxidized by air, in the bituminous sand treatment unit, the sand is separated from the bitumen by flotation using water at 85° C.

We assume that it is desired to produce 100 000 BPSD of Athabasca and that, for each barrel produced, two barrels of water are consumed. The amount of water required thus is 200 000 BPSD.

Definition of the Hot Water Requirement

It is desired to produce 200 000 BPSD water to be heated from 10° C. to 85° C., which requires an available power of 116 MW.

The oxygen carrier selected is nickel oxide, advantageously made up of 60% NiO and 40% $NiAl_2O_3$ in oxidized form.

The oxygen transport capacity of the solid considered is 12.8 mass %. During operation of the system, only 15% of this capacity is used. An oxygen transport capacity equivalent to 2% of the mass of solid is thus deduced. This leads to an oxygen-carrying solid circulation of 1.1 t/s. This solid circulation rate can be technically reached for a circulating fluidized bed device.

We consider the solid leaving the "air" reactor (line (4) in FIG. 1) in its maximum oxidation state. It is fed into reactor (R1) referred to as the "fuel" reactor.

Reaction in the "Fuel" Reactor

The feedstock is oxidized in an endothermic reaction by the oxygen carrier. For 1 t/h bitumen, the power consumed in the "fuel" reactor is 1081 kW.

This energy results from a minimization of the energy of formation of a model feedstock having the CHONS composition as follows:

| | |
|---|---|
| C | 82.7% |
| H | 10% |
| N | 0.6% |
| S | 5.7% |
| O | 1% |

The solid is then redirected in its minimum oxidation state (through line (7) in FIG. 1) from the "fuel" reactor to the "air" reactor where it reacts and is re-oxidized to its maximum oxidized state.

Reaction in the "Air" Reactor

The partly reduced oxygen carrier $NiO_{1-x}$ is re-oxidized to NiO during an exothermic reaction producing 10 800 kWth.

If we consider that the reactants need to be heated, then the surplus of the system is only 9.8 MWth for 1 t/h feedstock.

Thus, to produce 116 MWth, 12 t/h bitumen have to be consumed, i.e. an auto-consumption of approximately 1.8% of the Athabasca produced.

Water Management

Furthermore, the combustion of one ton of hydrocarbon feedstock of H/C molar ratio 1.53 generates one ton of water (by condensation in (E3) in FIG. 2), i.e. nearly half the amount of water required to treat the corresponding bituminous sand if it is recycled via line (14) of FIG. 2. 12 t/h water that are not taken from the environment of the unit are thus saved, which represents 96 000 m³ over a period of one year.

$CO_2$ Capture

Using a unit according to the invention allows capture of the 251 000 t/year $CO_2$ generated by the combustion of the bituminous feedstock. Besides, the discharge of 198 000 t/year $CO_2$ that would be emitted if natural gas were used without $CO_2$ capture to provide the heat required by the system is thus avoided.

The invention claimed is:

1. A process for treating bituminous feedstocks, comprising:
   a chemical loop combustion, the chemical loop combustion comprising:
   oxidizing a reduced oxygen carrier to provide an oxidized oxygen carrier; and
   combusting a fuel by contacting the hydrocarbon feedstock with the oxidized oxygen carrier;
   separating organic and mineral components from a bituminous feedstock in a hot water treatment unit by exposing the bituminous feedstock to hot water,
   wherein the energy required to heat the water exposed to the bituminous feedstock is provided by the chemical loop combustion, and
   wherein a fraction of the organic components separated from the bituminous feedstock in the hot water treatment unit is used as fuel for said chemical loop combustion, the fraction comprising bitumen.

2. A process as claimed in claim 1, wherein the bitumen of the fraction of the organic components separated from the bituminous feedstock used as fuel in the chemical loop combustion ranges between 0.1 and 10 wt. % of the bitumen extracted from the hot water treatment unit.

3. A process as claimed in claim 2, wherein the bitumen of the fraction of the organic components separated from the bituminous feedstock used as fuel in the chemical loop composition ranges between 0.1 and 5 wt. % of the bitumen extracted from the hot water treatment unit.

4. A process as claimed in claim 1, wherein the energy required to heat the water exposed to the bituminous feedstock is extracted by at least one of an exchanger arranged inside a combustion enclosure, an exchanger arranged on the wall of a combustion enclosure, an exchanger added to a combustion enclosure, an exchanger arranged inside an oxidation enclosure, an exchanger arranged on the wall of an oxidation enclosure, an exchanger added to an oxidation enclosures, an exchanger on fume lines and an exchanger on metallic oxide transfer lines.

5. A process as claimed in claim 1, wherein the bituminous feedstock is directly fed into a reduction reactor of said chemical combustion loop.

6. A process as claimed in claim 1, wherein the bituminous feedstock is treated in a fluidized-bed reactor to produce a syngas.

7. A plant for treating a bituminous feedstock according to the process as claimed in claim 1, said plant comprising at least:
   a chemical loop containing:
      an oxidation reaction zone, supplied with air;
      a reduction reaction zone;
   a heat exchange zone located in at least one of an exchanger arranged inside a combustion enclosure, an exchanger arranged on the wall of a combustion enclosure, an exchanger added to a combustion enclosure, an exchanger arranged inside an oxidation enclosure, an exchanger arranged on the wall of an oxidation enclosure, an exchanger added to an oxidation enclosures, an exchanger on fume lines and an exchanger on metallic oxide transfer lines;
   a treatment unit for separating the mineral component and the organic component the bituminous feedstock operating in the presence of water and soda, at a temperature ranging between 80° C. and 90° C., the water being heated in zone,
   a line for extracting a fraction of the bitumen from the treatment unit; and
   a line for sending said fraction as fuel to the reduction reaction zone,
   wherein the reaction of oxidation of the oxygen carrier occurs after the reduction of the oxygen carrier in the reduction reaction zone,
   wherein combustion takes place in the presence of the fuel and the oxygen present in said oxidized oxygen carrier, and
   wherein a heat flux for heating a water stream carried by a water stream line in the heat exchange zone is produced by the at least one heat exchanger.

8. A plant as claimed in claim 7, also comprising
   a condenser;
   a line supplying the condenser with gaseous effluents from the reduction reaction zone;
   a line for extracting a $CO_2$-rich gaseous effluent from the condenser; and a line carrying hot water from the condenser to the heat exchange zone, wherein the carried hot water is mixed with the water stream carried by the water stream line.

9. A plant as claimed in claim 7, said plant also comprising:
a gasification reaction zone, the gasification reaction zone consisting of a fluidized bed reactor;
a syngas extraction line connected to the fluidized bed reactor;
a line supplying said reduction reaction zone with fuel;
a condenser;
a line supplying the condenser with gaseous effluents from said reduction reaction zone;
a line for extracting a $CO_2$-rich gaseous effluent from the condenser;
a line carrying hot water from the condenser to the heat exchange zone, wherein the carried hot water is mixed with the water stream carried by the water stream line;
a compressor connected to the line for extracting the $CO_2$-rich gaseous effluent from the condenser; and
a line injecting gas from the compressor into reduction reaction zone.

10. A plant as claimed in claim 7, said plant also comprising:
a solid-solid separator;
a line connecting the solid-solid separator to the heat exchange zone;
a line connecting the solid-solid separator to the oxidation reaction zone; and
a line connecting the solid-solid separator to the reduction reaction zone,
wherein the mineral component of the bituminous feedstock is separated from an oxygen-carrying solid and carried through the line connecting the solid-solid separator to the heat exchange zone,
wherein the oxygen-carrying solid is extracted from separator through the line connecting the solid-solid separator to the oxidation reaction zone.

* * * * *